US012780080B2

(12) United States Patent
Robertson et al.

(10) Patent No.: US 12,780,080 B2
(45) Date of Patent: Nov. 3, 2026

(54) VEHICLE LIGHTING CONTROL AND METHOD

(71) Applicant: Ford Global Technologies, LLC, Dearborn, MI (US)

(72) Inventors: Michael Robertson, West Bloomfield, MI (US); Aaron Bradley Johnson, Allen Park, MI (US); Segundo Baldovino, Novi, MI (US); Venkatesh Krishnan, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 128 days.

(21) Appl. No.: 18/772,397

(22) Filed: Jul. 15, 2024

(65) Prior Publication Data

US 2026/0014927 A1 Jan. 15, 2026

(51) Int. Cl.

| | |
|---|---|
| ***B60Q 1/08*** | (2006.01) |
| ***B60Q 1/16*** | (2006.01) |
| ***G06V 20/58*** | (2022.01) |

(52) U.S. Cl.

CPC ............... *B60Q 1/085* (2013.01); *B60Q 1/16* (2013.01); *B60Q 2300/122* (2013.01); *B60Q 2300/132* (2013.01); *B60Q 2300/14* (2013.01); *B60Q 2300/45* (2013.01); *B60Q 2400/20* (2013.01); *G06V 20/582* (2022.01)

(58) Field of Classification Search

CPC ................ B60Q 2300/42; B60Q 1/085; B60Q 2300/41; B60Q 1/143; B60Q 2300/054; B60Q 2300/312; B60Q 2300/056; B60Q 2300/314; B60Q 1/1423; B60Q 2300/112; B60Q 2300/122

See application file for complete search history.

(56) References Cited

U.S. PATENT DOCUMENTS

| | | | | |
|---|---|---|---|---|
| 4,061,362 | A | 12/1977 | Bufler | |
| 6,040,766 | A | 3/2000 | Lubke et al. | |
| 9,156,474 | B2 | 10/2015 | Holub et al. | |
| 9,771,021 | B1 * | 9/2017 | Lindsay | B60Q 1/525 |
| 11,002,422 | B1 | 5/2021 | Johnson et al. | |
| 2017/0061812 | A1 * | 3/2017 | Lahav | G06Q 40/08 |
| 2018/0180243 | A1 * | 6/2018 | Na | B60Q 1/02 |
| 2020/0384913 | A1 * | 12/2020 | Nobuhara | B60K 35/22 |
| 2025/0196755 | A1 * | 6/2025 | Bartscher | B60Q 1/085 |

FOREIGN PATENT DOCUMENTS

| | | | |
|---|---|---|---|
| GB | 2523354 | A | 8/2015 |
| WO | 2019121520 | A1 | 6/2019 |

* cited by examiner

*Primary Examiner* — Wei (Victor) Y Chan

(74) *Attorney, Agent, or Firm* — Vichit Chea; Price Heneveld LLP

(57) ABSTRACT

A vehicle has a navigation device for detecting a geographic location of the vehicle, a beam shaping lamp configured to illuminate light in a light beam pattern, and a controller configured to process the geographic location and to determine a geographic region. The controller determines a light beam pattern in compliance with lighting regulations associated with the determined geographic region. The controller configures the beam shaping lamp to generate the light beam pattern in compliance with the lighting regulations.

18 Claims, 6 Drawing Sheets

VEHICLE LIGHTING CONTROL AND METHOD

FIELD OF THE DISCLOSURE

The present disclosure generally relates to vehicle lighting, and more particularly relates to controlling lighting, such as headlamps, on a vehicle in accordance with geographic based lighting regulations.

BACKGROUND OF THE DISCLOSURE

Motor vehicles are commonly equipped with various user selectable lighting devices. For example, vehicle exterior lamps may include headlamps, daytime running lamps, brake lamps, turn signal lamps, tail lamps and other lighting devices. It may be desirable to provide for efficient control of vehicle lighting that accounts for changes in regulations when driving from one geographic location to another.

SUMMARY OF THE DISCLOSURE

According to a first aspect of the present disclosure, a vehicle has a navigation device for detecting a geographic location of the vehicle, a beam shaping lamp configured to illuminate light in a light beam pattern, and a controller configured to process the geographic location and to determine a geographic region. The controller determines a light beam pattern in compliance with lighting regulations associated with the determined geographic region. The controller configures the beam shaping lamp to generate the light beam pattern in compliance with the lighting regulations.

Embodiments of the first aspect of the present disclosure can include any one or a combination of the following features:

- the beam shaping lamp comprises a pixel lamp;
- the pixel lamp comprises a plurality of light emitting diodes configured in an array, each of the plurality of diodes being selectively activatable to generate the beam output;
- an imaging camera configured to capture images of a surrounding environment, wherein the controller processes the video images to detect one or more road signs, and further determines the geographic region based on the detected one or more road signs;
- the navigation device comprises a global positioning system receiver;
- the lighting regulations are stored in memory;
- the lighting regulations include a lighting ordinance;
- the geographic region comprises a country;
- the beam shaping lamp is located on an exterior of the vehicle;
- the beam shaping lamp is configured as a vehicle head lamp; and
- a color of the illuminated light is changed based on the lighting regulations for the determined geographic region.

Another aspect of the present disclosure includes a method of controlling a beam pattern of a beam shaping lamp on a motor vehicle. The method includes activating the beam shaping lamp to generate light illumination in a first light beam pattern, determining a geographic location of the motor vehicle, determining whether the motor vehicle travels from a first geographic region to a second geographic region having different lighting regulations, selecting a second light beam pattern in compliance with the lighting regulations associated with the second geographic region, and controlling the beam shaping lamp to change the light illumination to the selected light beam pattern in compliance with the lighting regulations.

Embodiments of the second aspect of the present disclosure can include any one or a combination of the following features:

- notifying an occupant of the vehicle when the first light beam pattern is changed to the second light beam pattern;
- a plurality of light emitting diodes configured in an array, each of the plurality of diodes being activatable to generate the first and second light beam patterns;
- an imaging camera configured to capture images of a surrounding environment, wherein the controller processes the video images to detect one or more road signs, and further determines the geographic region based on the detected road signs;
- the step of determining the geographic location includes processing signals received from a global positioning system receiver;
- the lighting regulations may include a lighting ordinance;
- the geographic region comprises a country;
- the beam shaping lamp is configured as a vehicle head lamp; and
- the step of changing a color of the light illumination based on the lighting regulations for the determined geographic region.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
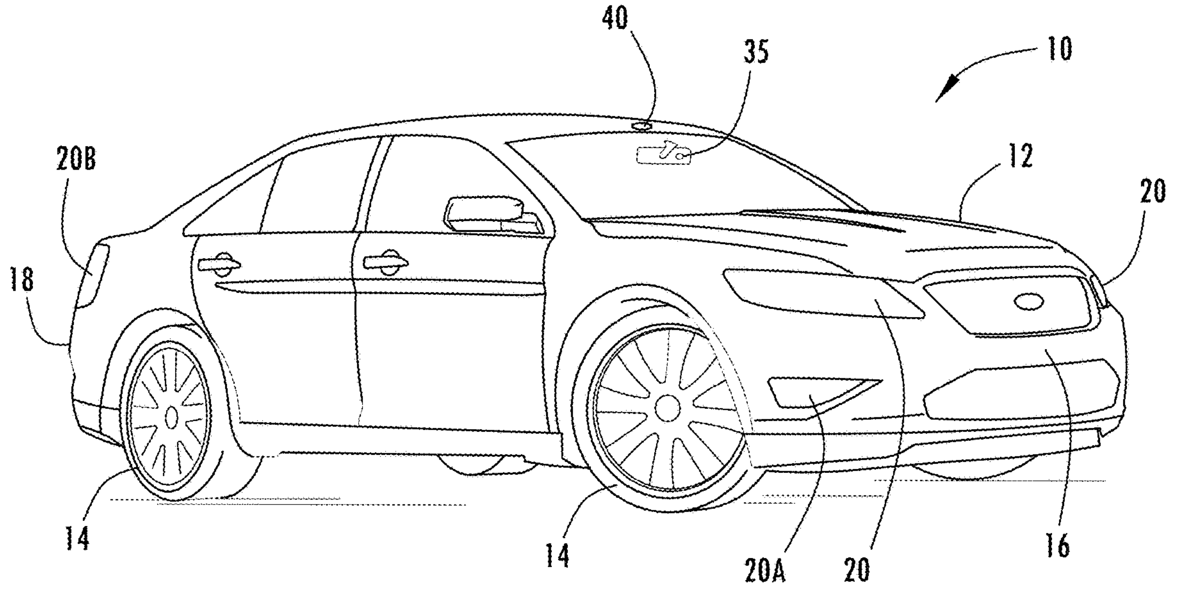
FIG. 1 is a front perspective view of a motor vehicle equipped with exterior lamps including head lamps, fog lamps and tail lamps, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a motor vehicle light control system and method. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
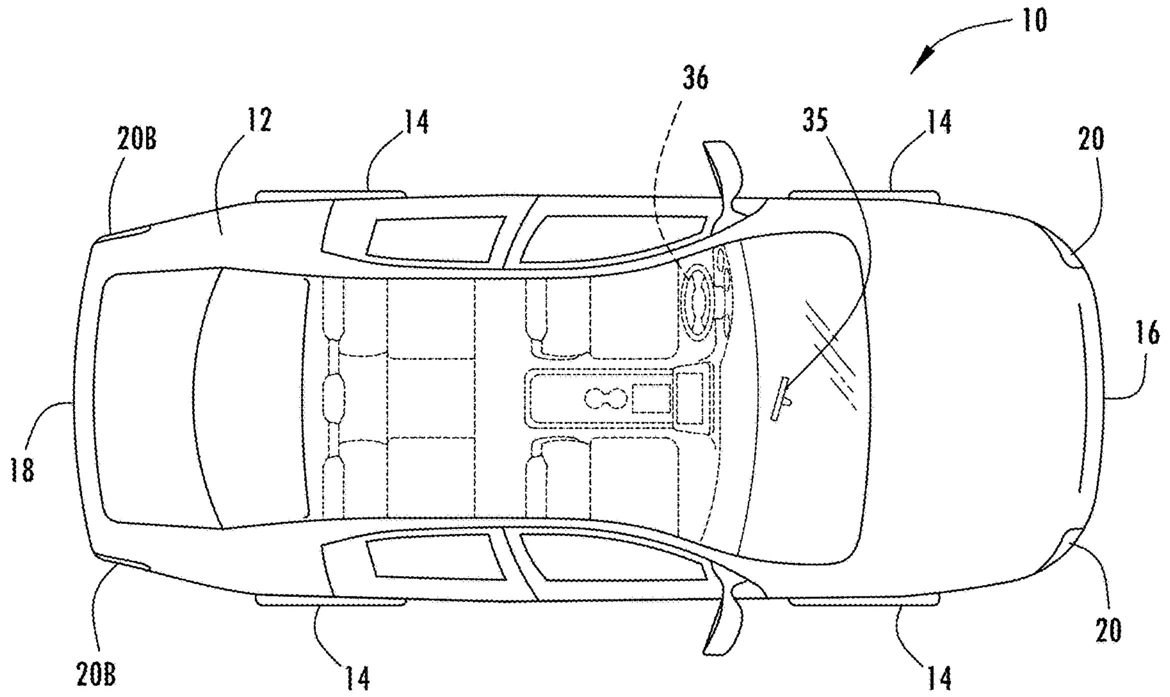
FIG. 2 is a top schematic view of the motor vehicle illustrated in FIG. 1.

Referring to FIGS. 1 and 2, one example of a motor vehicle 10 is generally illustrated equipped with a plurality of light illumination lamps 20, 20A and 20B generally shown located on the exterior at the front end 16 and rear end 18 of the motor vehicle 10. The motor vehicle 10 has a body 12 that defines a cabin interior with a passenger compartment and is generally supported on a plurality of wheel and tire assemblies 14. The plurality of lamps 20 in the example shown at the front end 16 of the motor vehicle 10 are configured as head lamps located at the opposite front corners of the motor vehicle 10 and configured to generate a head light beam directed in the exterior forward of the motor vehicle 10. The lamps 20A may be fog lamps. The lamps 20B may be tail lamps on opposite rear corners of the motor vehicle 10. In addition, the plurality of lamps may include daytime running lamps, side marker lamps and turn signal lamps, for example, at the front end 16, and may include tail lamps, brake lamps, backup lamps and turn signal lamps, for example, at the rear end 18 of the motor vehicle 10. In addition, it should be appreciated that the motor vehicle 10 may have a plurality of other lamps that may be configured with geographic based beam shaping as shown and described herein. Each lamp 20 is configured as a light illumination beam forming lamp that may be controlled to form or change the shape of the light illumination beam pattern to accommodate various geographic regulations as the motor vehicle 10 travels from one geographic region, such as for example a first country, into another geographic region, such as a second country.

The cabin interior of the motor vehicle 10 may be configured with a plurality of seats to accommodate a driver and one or more passengers as occupants of the motor vehicle 10. Seated forward of the driver's seat is a steering wheel 38 for allowing the driver to steer the motor vehicle

10. The steering wheel 38 may include one or more sensors for sensing the angle of rotation of the steering wheel 38. The motor vehicle 10 is further equipped with one or more cameras, such as a forward-facing camera 36 that may capture images of the roadway and surrounding area generally forward of the motor vehicle 10 along the path of travel of the motor vehicle 10.

The motor vehicle 10 may also be equipped with a human machine interface (HMI) in the form of a display 35 which is generally shown located forward of the front row of seating between driver and passenger seats, such as proximate to or built into an instrument panel or dashboard. The display 35 may include a touchscreen, for example, display receiving user inputs and providing a display output. The display 35 may advantageously communicate wirelessly with one or more portable devices, such as a smartphone and may interact with one or more phone apps.

The motor vehicle 10 is equipped with a navigation location determining device in the form of a global positioning system (GPS) receiver 40. The GPS receiver 40 may be located within or on the body 12 of the motor vehicle 10, such as on the roof as shown, for example. The GPS receiver 40 may be located elsewhere on the vehicle such as in or proximate to one or more of the lamps 20, 20A and 20B. The GPS receiver 40 receives GPS signals from a plurality of satellites that are processed to determine the geographic location of the motor vehicle 10. In addition, the GPS signals may provide time of day and date, i.e., time of year, data. The determined geographic location and time and date information may be used to determine appropriate lighting, such as the light beam pattern, pursuant to local regulations and ordinances applicable to the geographic region of the motor vehicle 10.

Figure 3:
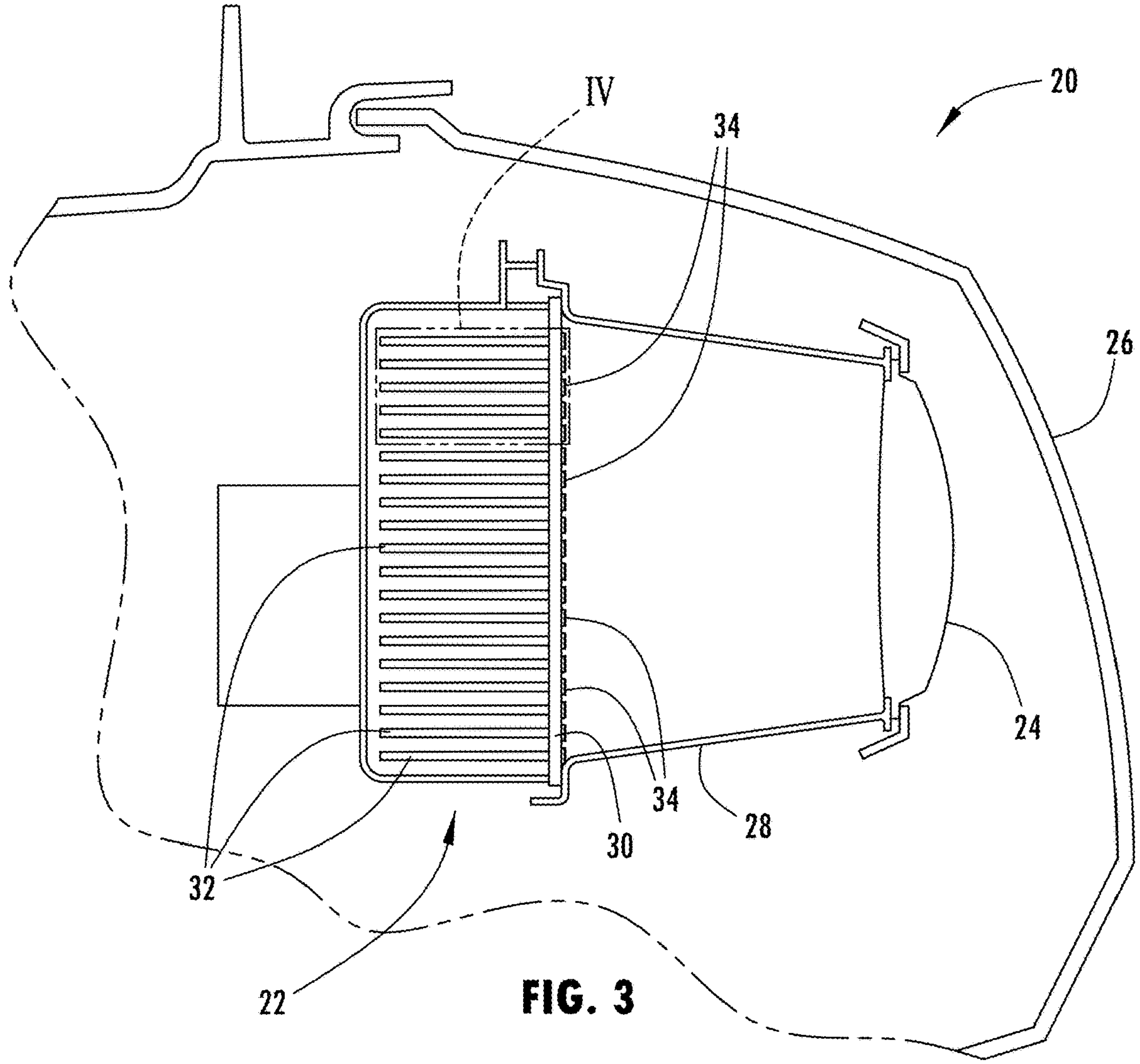
FIG. 3 is an enlarged breakaway view of one of the head lamps of the vehicle equipped with a beam shaping pixel lamp, according to one example.
Figure 4:
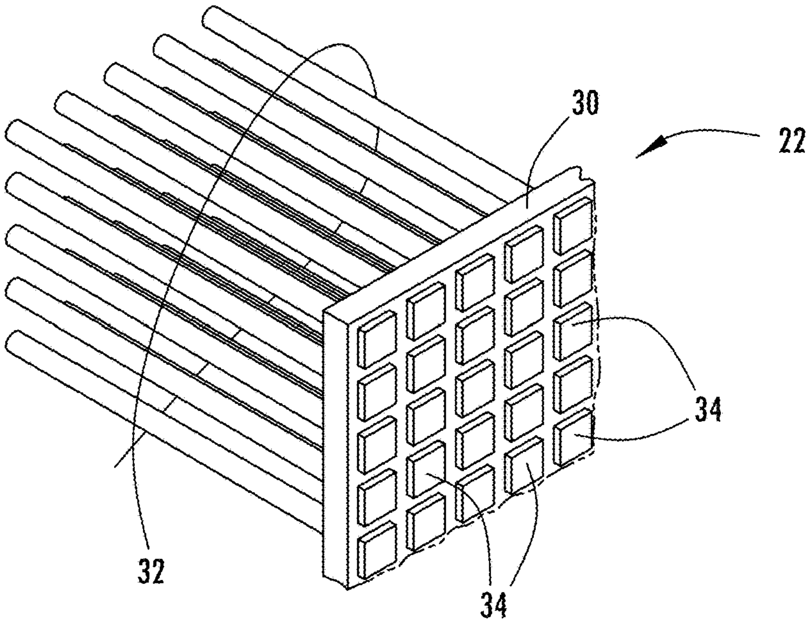
FIG. 4 is a front perspective view of the beam shaping pixel lamp illustrated in FIG. 3.

Each of the lamps 20, 20A and 20B may be configured with a beam shaping lamp. Referring to FIGS. 3-4, one example of a beam shaping lamp 20 embodied as a pixel lamp is illustrated. The beam shaping lamp 20 is controllable via a controller to change the pattern of the light illumination beam. The beam shaping lamp 20 as shown and described herein as a pixel lamp, according to one example. According to other examples, the beam shaping lamp may be a matrix lamp or a laser lamp. The beam shaping lamp 20 has control circuitry that is programmable and readily capable of being reconfigured to generate a selectable light illumination beam pattern, particularly a light illumination beam pattern that complies with local regulations applicable to the geographic region of interest.

The pixel lamp shown in FIGS. 3-4 includes a plurality of lighting devices, shown as light emitting diodes (LED) 34 mounted on a circuit board 30. The light emitting diodes 34 may be configured as Red-Green-Blue (RGB) LEDs that may generate light having any color. The plurality of lighting devices are powered by electrical current supplied via circuitry on the circuit board 30 and are generally arranged in an array of rows and columns in the example shown. The circuit board 30 may be thermally coupled to a heat sink to direct heat away from the LEDs. The heat sink 32 has a plurality of thermally conductive members such as metal rods to dissipate heat away from the LEDs 34. The pixel lamp 22 provides illumination via each of the light emitting devices 34, each of which provide a pixel within an array having a plurality of rows and columns of pixels. It should be appreciated that each of the light emitting devices 34 may be individually turned ON and OFF to achieve a desired overall beam pattern. While a pixel lamp 22 is generally described herein, it should be appreciated that other forms of beam shaping lamps may be used such as shapable lenses for lens arrangements that may change the light beam from one light beam pattern to another light beam pattern.

The lamp 20 has a housing 28 extending generally forward of the pixel lamp 22. An inner lens 24 is coupled to the front end of the housing. An outer head lamp housing 26 extends in front of the inner lamp and encapsulates the pixel lamp 22, housing 28 and inner lens 24.

Figure 5A:
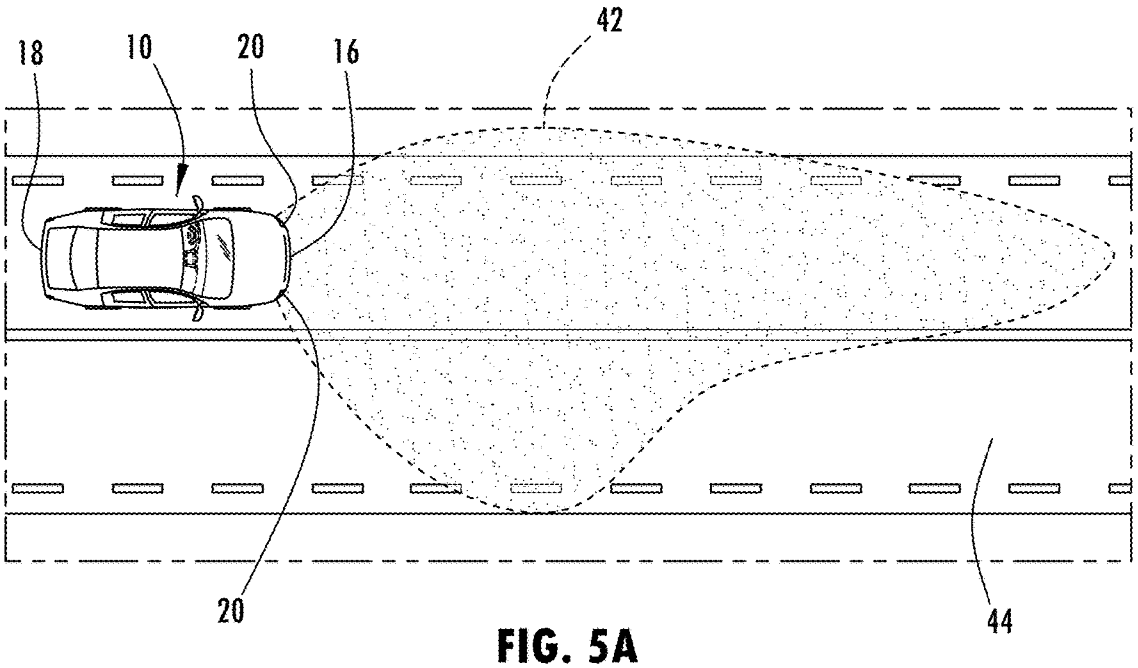
FIG. 5A is a schematic top view of the motor vehicle illustrating the head lamps generating a first light beam pattern according to a first controlled operation.
Figure 5B:
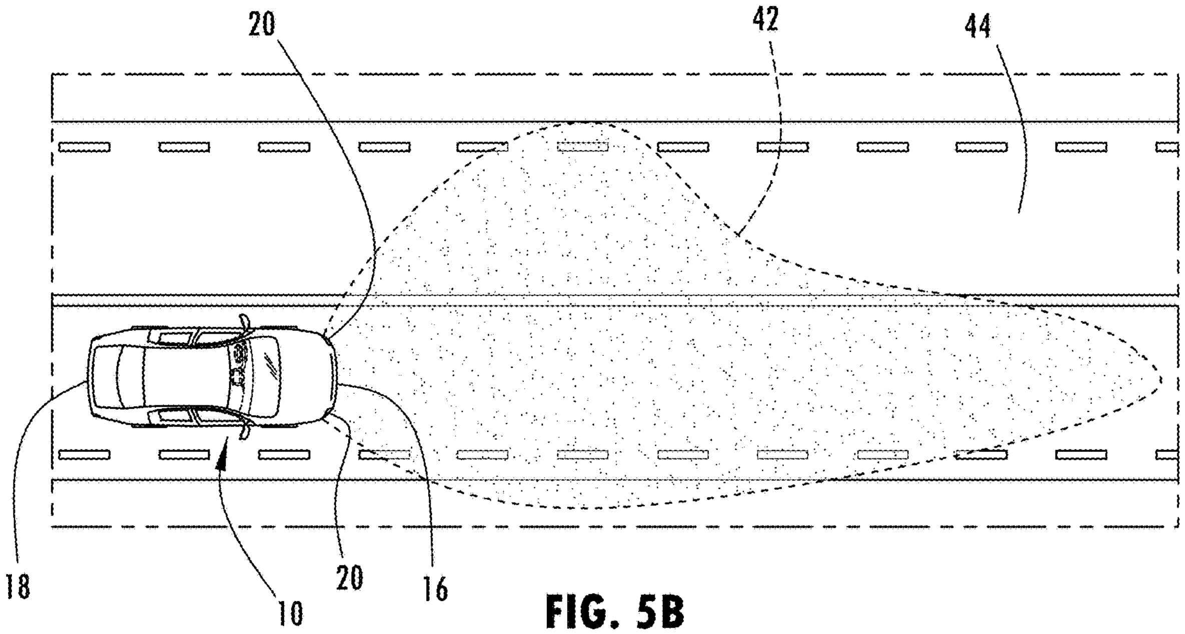
FIG. 5B is a top view of the motor vehicle with the head lamps generating a second light beam pattern.

Referring to FIGS. 5A and 5B, one example of a light illumination beam pattern 42 generated by the pair of head lamps 20 is illustrated in a roadway driving scenario. In FIG. 5A, the light illumination beam pattern 42 generated by the pair of head lamps 20 accommodates a left-hand side motor vehicle 10 that is riding in the left lane of a two-lane roadway 44. The beam pattern 42 in this example has an elongated extended beam pattern generally forward of the motor vehicle 10 to cover the left lane in the travel path of the motor vehicle 10 and has a wider and less extended beam pattern illuminating the right-hand side lane. The illuminated beam pattern 42 shown in FIG. 5A may comply with lighting regulations in a first geographic region such as a first country, for example. When the motor vehicle 10 travels from the first country into a second geographic region such as a second country which has different vehicle regulations, the beam pattern generated by the beam shaping lamp may be reconfigured to a different pattern such as is shown for a vehicle driving on the right-hand side of the roadway 44 as seen in FIG. 5B, for example. Since the motor vehicle 10 is driven on the other side of the road in this example, the light pattern may be changed to accommodate the change in lighting regulations from the first country to a second country.

Figure 6A:
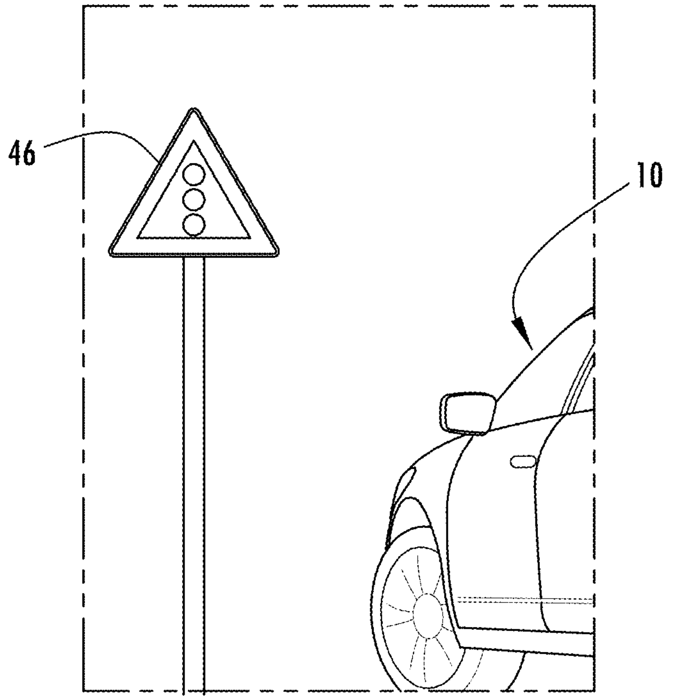
FIG. 6A is a perspective view of the motor vehicle approaching a road sign on a left side of the motor vehicle.
Figure 6B:
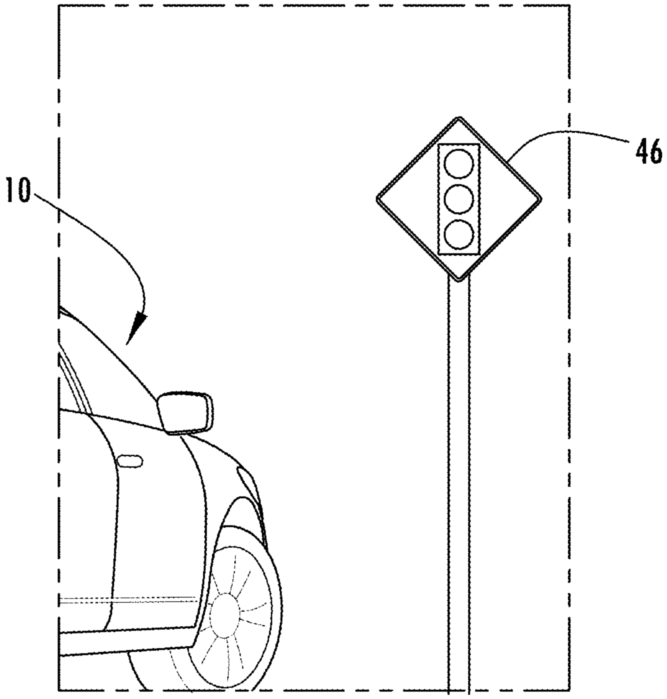
FIG. 6B is a perspective view of the motor vehicle approaching a road sign on an opposite second side of the motor vehicle.

Referring to FIGS. 6A and 6B, the motor vehicle 10 is shown proximate to a road sign 46 on the left side of the motor vehicle 10, according to one example. In the example shown in FIG. 6B, the motor vehicle 10 is driven proximate to a road sign 46 on the opposite side of the motor vehicle 10. The motor vehicle 10 may employ one or more imaging cameras such as the forward facing camera 36 and image processing to detect the presence of the road sign, including the location and the shape of the sign, to help enhance the recognition of a geographic location such as a particular country that the motor vehicle is traveling in. Thus, the detection of the road sign 46 may assist with the navigation location determining device to determine the location of the motor vehicle 10 entering or leaving a geographic region and thus may determine the regulations associated with the current geographic region.

Figure 7:
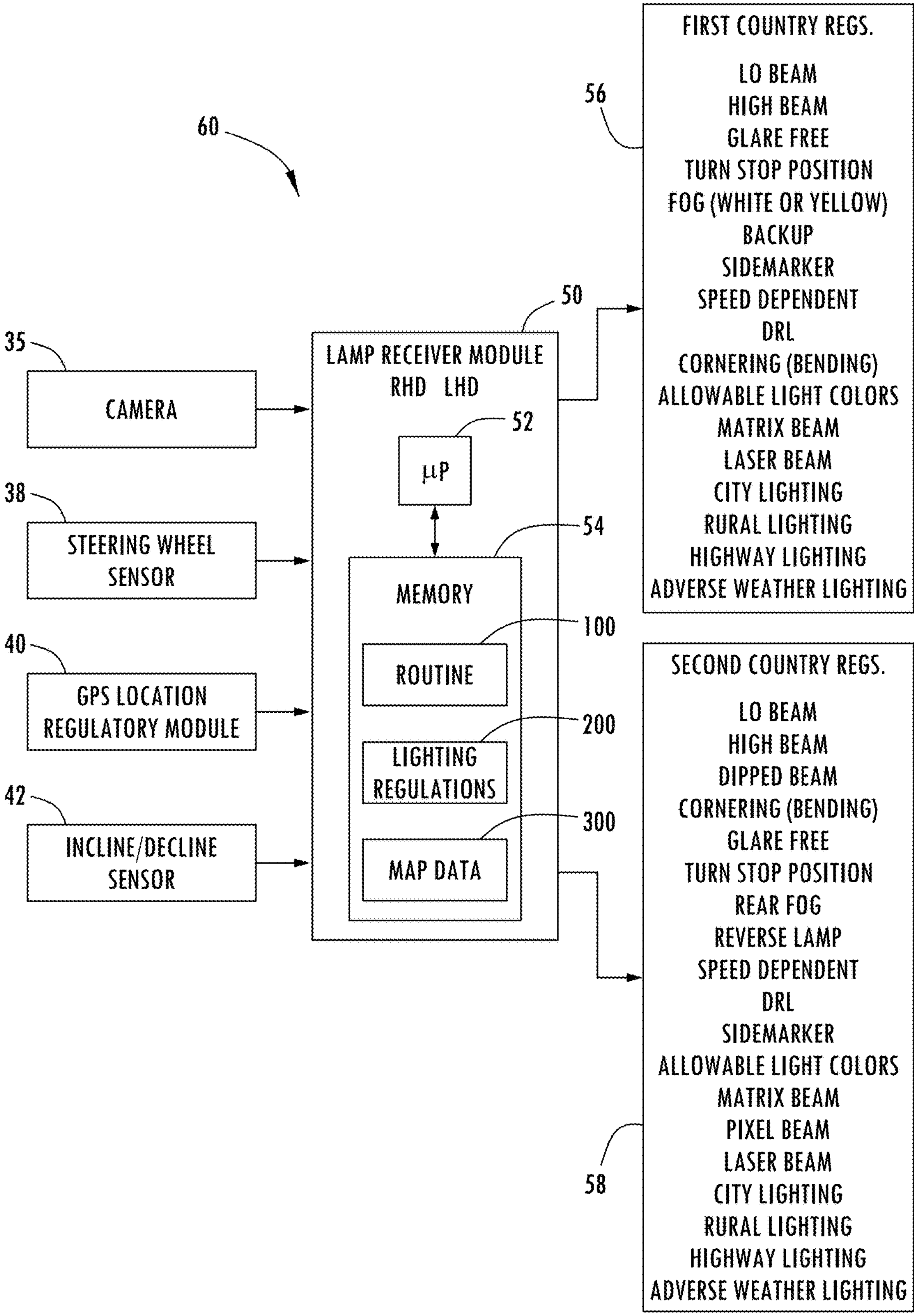
FIG. 7 is a block diagram of the light control system for controlling the light beam pattern on the motor vehicle, according to one example.

The motor vehicle 10 has a lighting control system 60 which is illustrated in one embodiment in FIG. 7. The motor vehicle lighting control system 60 includes a controller 50 with control circuitry that may include a microprocessor 52 and memory 54. It should be appreciated that the controller 50 may employ a shared or dedicated controller and may include other analog and/or digital circuitry. Stored in memory 54 and executed by the microprocessor 52 is a control routine 100 for executing the method. Also stored in memory 54 are one or more lighting regulations 200 and map data 300 for determining the relative location of the motor vehicle 10 based on the GPS signals and the geographic region. The lighting regulations 200 may be initially stored in memory 54 ahead of time or may be downloaded to the motor vehicle 10 periodically or continuously and may be received from communication towers and satellites such as cellular towers and from other vehicles via vehicle-to-vehicle communication.

The controller 50 receives and processes the various inputs including video images captured from the forward facing camera 36, vehicle incline and decline signals captured by an incline/decline sensor 42, and the steering wheel angle information captured by the steering wheel sensor 38. In addition, the controller 50 receives signals from the GPS location regulatory module 40 which may include the determined GPS location data.

The controller 50 executes the control routine 100 based upon the various inputs and the map data 300 and lighting regulations 200 and generates outputs that may be used to control one or more beam shaping lamps on the motor vehicle 10 to comply with the lighting regulations in different geographic regions, such as different countries, for example. In the example shown, the lighting requirements for lighting devices in one country, such as, for example, Canada, may include controlling the light illumination beam pattern for various light functions, such as low beam, high beam, glare-free, turn stop position, fog lamps and the color of the fog lamps, backup lamps, side marker lamps, speed dependent daytime running lamps, and cornering and bending the lamps. In addition, the lighting requirements in a particular country may allow for changes in color of the lamp. Further, the types of lighting in compliance with lighting regulations in a particular country may adjust the light beam pattern based on highway lighting, rural lighting, city lighting and adverse weather lighting. The various lighting requirements set forth in block 56 for a first country may be different from the lighting requirements set forth in block 58 for a different second country, such as the United States. Thus, as the motor vehicle travels from a first country to a second country, the light control system advantageously may automatically change the lighting beam pattern and may provide a notification of the change to the occupants, such as the driver, in the motor vehicle 10.

Figure 8:
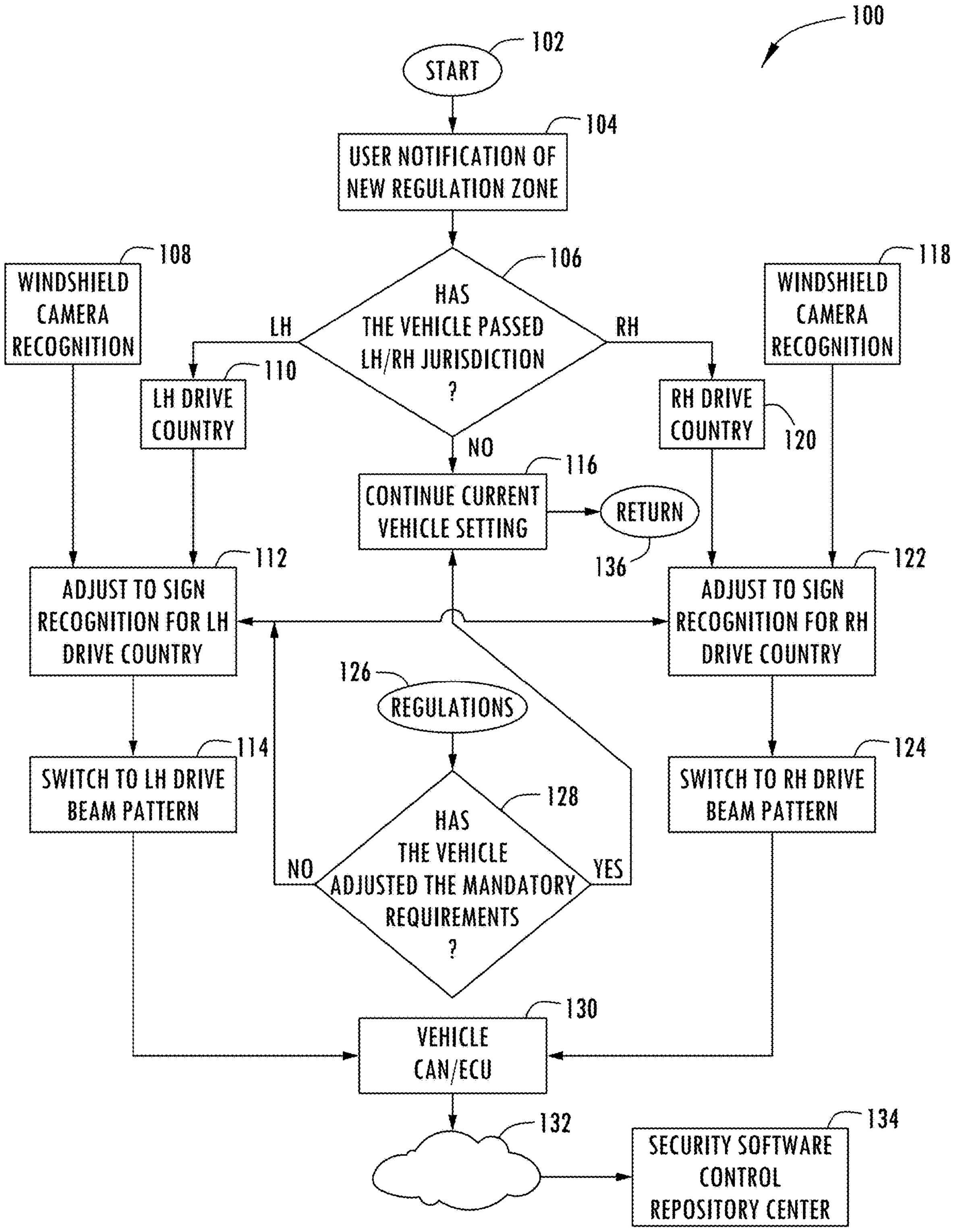
FIG. 8 is a flow diagram illustrating a routine for monitoring location of the motor vehicle and controlling the light beam pattern according to the geographic location.

Referring to FIG. 8, one example of the control routine 100 for controlling the vehicle lamp is illustrated, according to one example. Routine 100 begins at step 102 and proceeds to step 104 to provide a notice to a user, such as the driver of the motor vehicle, of a new regulation geographic zone. The motor vehicle determines the geographic location and looks up the new regulation for the zone that the motor vehicle 10 is currently located in. At decision step 106, routine 100 determines if the motor vehicle has passed a left-hand or right-hand driving jurisdiction and, if not, continues with the current vehicle settings with the lamp, before returning to step 106. If the motor vehicle has passed into a left-hand driving jurisdiction, routine 100 proceeds to step 110 to select the left-hand drive country settings to comply with their regulations. Next, at step 112, routine 100 adjusts the location determination with sign recognition for the left-hand drive country which may be determined by images captured with the windshield camera at step 108. Next, routine 100 proceeds to step 114 to switch the vehicle lamp to the left-hand drive beam pattern. In addition, the control routine 100 may communicate via a CAN/ECU with a repository center 134 via the cloud 132. As such, the lighting patterns for geographic regions may be saved for future use.

Returning to decision step 106, if the motor vehicle has passed to a right-hand driving jurisdiction, routine 100 proceeds to step 112 to the right-hand drive country settings to comply with their regulations. Next, routine 100 proceeds to adjust the location determination with sign recognition for the right-hand drive country using the camera in the windshield at step 118. Routine 100 then switches to the right-hand beam pattern at step 124 and further may communicate with the repository center 134 via the cloud 132.

In addition, lighting regulations may be provided to the motor vehicle at step 126. Routine 100 then may determine if the motor vehicle has adjusted to the mandatory requirements and, if yes, returns to step 116 to continue using the current vehicle lighting settings. If the motor vehicle has not yet adjusted to the mandatory lighting requirements, routine 100 returns to step 112.

Accordingly, the motor vehicle lighting control system 50 and method advantageously utilizes location and regulatory information to determine and control one or more vehicle lamps on a motor vehicle 10 to control the light beam pattern to be compliant with local ordinance rules or regulations. The lighting control system 50 and method further may advantageously notify the driver of any non-compliance as changes are made to the vehicle lighting pattern.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a navigation device for detecting a geographic location of the vehicle;

a beam shaping lamp configured to illuminate light in a light beam pattern;

an imaging camera configured to capture images of a surrounding environment; and a controller configured to process the geographic location and to determine a geographic region, wherein the controller processes the captured images to detect one or more road signs, and further determines the geographic region based on both the geographic location and the detected one or more road signs, the controller determining a light beam pattern in compliance with lighting regulations associated with the determined geographic region, wherein the controller configures the beam shaping lamp to generate the light beam pattern in compliance with the lighting regulations.

2. The vehicle of claim 1, wherein the beam shaping lamp comprises a pixel lamp.

3. The vehicle of claim 2, wherein the pixel lamp comprises a plurality of light emitting diodes configured in an array, each of the plurality of diodes being selectively activatable to generate the beam output.

4. The vehicle of claim 1, wherein the navigation device comprises a global positioning system receiver.

5. The vehicle of claim 1, wherein the lighting regulations are stored in memory.

6. The vehicle of claim 1, wherein the lighting regulations include a lighting ordinance.

7. The vehicle of claim 1, wherein the geographic region comprises a country.

8. The vehicle of claim 1, wherein the beam shaping lamp is located on an exterior of the vehicle.

9. The vehicle of claim 8, wherein the beam shaping lamp is configured as a vehicle head lamp.

10. The vehicle of claim 1, wherein a color of the illuminated light is changed based on the lighting regulations for the determined geographic region.

11. A method of controlling a beam pattern of a beam shaping lamp on a motor vehicle, the method comprising:

activating the beam shaping lamp to generate light illumination in a first light beam pattern;

capturing images of a surrounding environment with an imaging camera;

processing the captured images from the imaging camera to detect one or more road signs;

detecting a geographic location of the motor vehicle with a navigation device;

determining a geographic region of the motor vehicle at least in part based on both the geographic location the detected one or more road signs;

determining whether the motor vehicle travels from a first geographic region to a second geographic region having different lighting regulations;

selecting a second light beam pattern in compliance with the lighting regulations associated with the second geographic region; and controlling the beam shaping lamp to change the light illumination to the selected light beam pattern in compliance with the lighting regulations.

12. The method of claim 11, further comprising notifying an occupant of the vehicle when the first light beam pattern is changed to the second light beam pattern.

13. The method of claim 11, further comprising a plurality of light emitting diodes configured in an array, each of the plurality of diodes being activatable to generate the first and second light beam patterns.

14. The method of claim 11, wherein the step of determining the geographic location further includes processing signals received from a global positioning system receiver.

15. The method of claim 11, wherein the lighting regulations may include a lighting ordinance.

16. The method of claim 11, wherein the geographic region comprises a country.

17. The method of claim 11, wherein the beam shaping lamp is configured as a vehicle head lamp.

18. The method of claim 11, further comprising the step of changing a color of the light illumination based on the lighting regulations for the determined geographic region.

* * * * *